15

(12) United States Patent
Hanks et al.

(10) Patent No.: US 7,576,765 B2
(45) Date of Patent: Aug. 18, 2009

(54) METHODS AND APPARATUS FOR DETECTING AND OPTIMIZING LASER MARK QUALITY ON RECORDING MEDIA

(75) Inventors: D. Mitchel Hanks, Fort Collins, CO (US); Lawrence N. Taugher, Loveland, CO (US); Kevin L. Colburn, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 692 days.

(21) Appl. No.: 11/127,667

(22) Filed: May 11, 2005

(65) Prior Publication Data

US 2006/0256687 A1    Nov. 16, 2006

(51) Int. Cl.
*B41J 2/435* (2006.01)
(52) U.S. Cl. ...................................... 347/246
(58) Field of Classification Search ........................ None
See application file for complete search history.

(56) References Cited

U.S. PATENT DOCUMENTS

| | | | |
|---|---|---|---|
| 4,948,233 A | 8/1990 | Maruyama | |
| 5,134,602 A | 7/1992 | Baca et al. | |
| 5,216,659 A | 6/1993 | Call et al. | |
| 5,631,887 A | 5/1997 | Hurst, Jr. | |
| 5,640,381 A | 6/1997 | Call et al. | |
| 5,978,335 A | 11/1999 | Clark et al. | |
| 6,225,595 B1 | 5/2001 | Wei et al. | |
| 6,246,660 B1 | 6/2001 | Yanagawa | |
| 6,335,916 B1 * | 1/2002 | Endo et al. | 369/275.4 |
| 6,418,102 B1 * | 7/2002 | Suga | 369/47.53 |
| 6,421,309 B1 * | 7/2002 | Kanai et al. | 369/59.17 |
| 6,483,666 B2 | 11/2002 | Wei et al. | |
| 6,639,177 B2 | 10/2003 | Ehrmann et al. | |
| 7,006,420 B1 * | 2/2006 | Hsu et al. | 369/59.12 |
| 2002/0118614 A1 | 8/2002 | Watt et al. | |
| 2002/0122359 A1 | 9/2002 | Yoshida | |
| 2002/0141313 A1 | 10/2002 | Chuang | |
| 2002/0141473 A1 | 10/2002 | Cordingley et al. | |
| 2003/0099177 A1 | 5/2003 | Wang et al. | |
| 2003/0108708 A1 | 6/2003 | Anderson et al. | |
| 2003/0161224 A1 * | 8/2003 | Anderson et al. | 369/30.58 |
| 2004/0090896 A1 | 5/2004 | Chuang | |
| 2004/0114472 A1 | 6/2004 | Wang et al. | |
| 2004/0125836 A1 | 7/2004 | Lai et al. | |

* cited by examiner

*Primary Examiner*—Joseph H Feild
*Assistant Examiner*—Joseph Haley

(57) ABSTRACT

A method for detecting and optimizing the quality of a mark made by a laser on a recording medium, comprising (a) recording a test mark at a selected level of laser power and a selected speed of movement of the recording medium, (b) measuring at least one dimension of the test mark, (c) comparing the at least one dimension of the test mark to a stored reference value for at least one reference dimension, and (d) determining whether the at least one dimension of the test mark is comparable to the at least one dimension of the stored reference value.

44 Claims, 10 Drawing Sheets

METHODS AND APPARATUS FOR DETECTING AND OPTIMIZING LASER MARK QUALITY ON RECORDING MEDIA

BACKGROUND

Low power lasers are employed to read and write binary data on the data side of media. One typical media are optical storage discs, such as CDs, DVDs and the like. Typically, various types of data are written on the data side of the disc by a laser beam while the disc is rotating. Data may be recorded by changing a property of a desired area on the recording media so that the area is indicative of a zero or one data value. Various data writing strategies have been employed, for the purposes of creating desirably shaped marks precisely positioned and having sharp edges to enable detection. Data is typically both written and read using the same laser, although the power used to write data is typically higher than the power used to read data.

Non-data areas such as the side of a data disc opposite the data side is often used for handwriting or affixing or marking a label with descriptions and illustrations corresponding to the recorded data. Recently, apparatus and methods have been developed with the ability to generate an optically-visible label on the non-data region of an optical disc using the same laser that was employed to read and write digital or electronic data on the data side of the disc. See U.S. Patent Application Publication No. 2003/0108708 (Anderson, et al.), disclosing the use of laser sensitive materials on a disc label that react chemically with the application of light and heat and result in changes in color and shading on the label.

In order to form labels having high image quality, the marks should have a good quality of darkness or optical density. The range of laser power that produces acceptable marking is relatively narrow, and power variations that may occur in the laser apparatus requires that the laser power be calibrated to bring the power within an acceptable margin of variation. Accordingly, methods of measuring marks are needed that will insure that the marks have acceptable quality. Measuring the marks using a laser in the drive would be advantageous.

However, it can often be difficult to detect with the laser optically visible marks that have been made in the light sensitive material by the laser. The chemistry of the label is optimized to absorb as much light as possible at the wavelength of the writing laser beam. As a result, there is very little reflectivity of light at the wavelength of the writing laser, and thus the change in reflectivity between written and unwritten areas is very small. Accordingly, it has been difficult to detect the quality of the visible marks being made on the label and to improve or optimize the marks, because of a very low signal-to-noise ratio (SNR). Other factors contributing to the low SNR problem are (1) the surface texture of the recording material, (2) noise in the photo-detectors generating the detection signal, (3) ambient light striking the photo-detectors, (4) noise in the read channel of the detection signal, and (5) high sensitivity to changes in reflectivity at different wavelengths.

SUMMARY OF THE INVENTION

A method for detecting and optimizing the quality of a mark made by a laser on a recording medium, comprising (a) recording a test mark at a selected level of laser power and a selected speed of movement of the recording medium, (b) measuring at least one dimension of the test mark, (c) comparing the at least one dimension of the test mark to a stored reference value for a corresponding at least one reference dimension, and (d) determining whether the at least one dimension of the test mark is comparable to the at least one dimension of the stored reference value.

DETAILED DESCRIPTION

Figure 1:
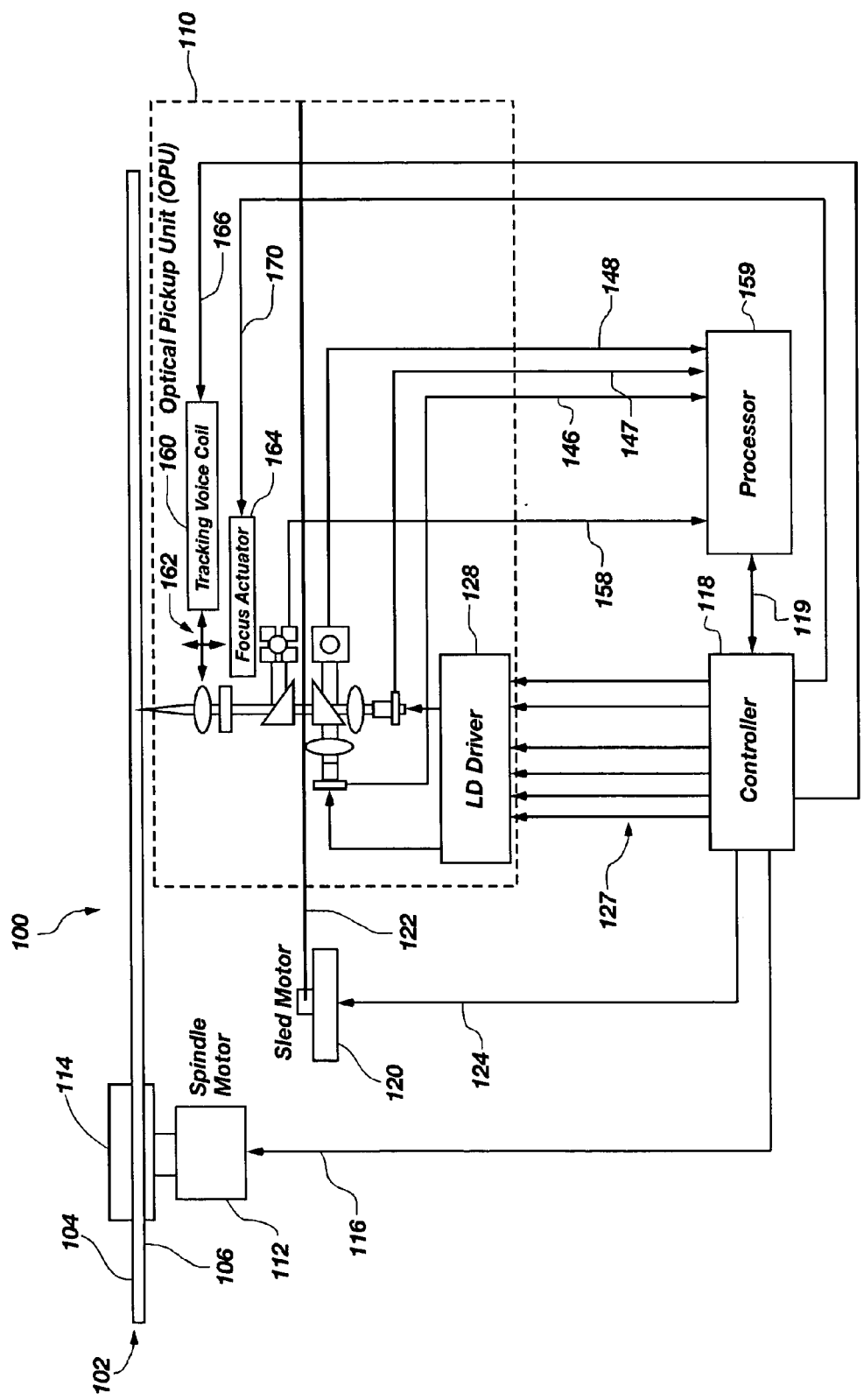
FIG. 1 is a schematic diagram of a laser writing and detection system according to an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Introduction

In one aspect of the present invention, a write laser generates a laser beam at a first wavelength to make marks on a light sensitive recording medium. The marks may be optically visible marks in a label area of the recording medium or data marks in data areas of a recording medium. The optically visible marks may form text, graphics, images, or a combination thereof that could be used, for example, to describe or represent the data on the recording medium. This imaging technology can be widely used to apply optically visible markings to any medium with light sensitive coating.

In detecting visible marks, a beam from the write laser or a separate detection laser is used to generate reflected light from the marks corresponding to the relative darkness or optical density of each image. Since the visual appearance of the mark is often important, in some embodiments the optical density of the mark may be determined using a detection laser operating with light in the visible spectrum, such as a red laser rather than an infrared laser.

In making marks on the label area of an optical disc drive, it is possible to determine whether the marks being made have suitable image quality using the variables of the system. The quality of each mark may be determined primarily by detecting the width and length of a mark on the label surface. These mark characteristics are a function of the on-time of the laser, the focus offset (i.e. the amount of defocusing of the laser beam), the spin rate of the disc and the laser power. If the laser on-time and focus offset are held constant, then the laser power or the disc spindle speed can be each separately varied while holding the other parameter constant. As these two parameters are varied, the size and shape of each mark will change.

For example, if the power is varied and the spindle speed is constant, the mark will grow larger as power is increased until an ablation limit is reached. As the power is reduced, the mark will grow smaller and fainter until it is no longer detectable. Similar variations will be seen if the power is held constant and the spindle speed is varied.

One embodiment of the present invention is concerned with detecting and optimizing the quality of visible marks being used for labeling on recording media. The detected results are used to calibrate the lasers being used, to provide optimal power levels for given spindle speeds, by measuring marks on the disc using laser light reflections. In one embodiment, a well-written reference mark is selected prior to testing, having a desired width and length, and the track width and length of the reference mark are detected and stored in memory as reference data. This reference data may include a set of width and length data for various laser power and spindle speed ratios.

At the time that label recording on a particular medium is performed, the characteristics of the medium are first determined, so as to calibrate the laser power and spindle speed to optimize label recording on that medium. Test marks are made in a test area at various laser powers and spindle speeds. Each test mark is then scanned in the radial and circumferential directions to measure the shape of the test mark, and data is provided that corresponds to each mark shape. Mark data sets are developed for test marks written at varying spindle speeds or laser power levels, so that a data curve is generated. The mark data sets are then compared to the reference mark data sets, mentioned above, to determine a set of preferred speed/power ratios and a desired operating point for the medium on which recording is to be done.

Laser Writing System For Labeling

Figure 2:
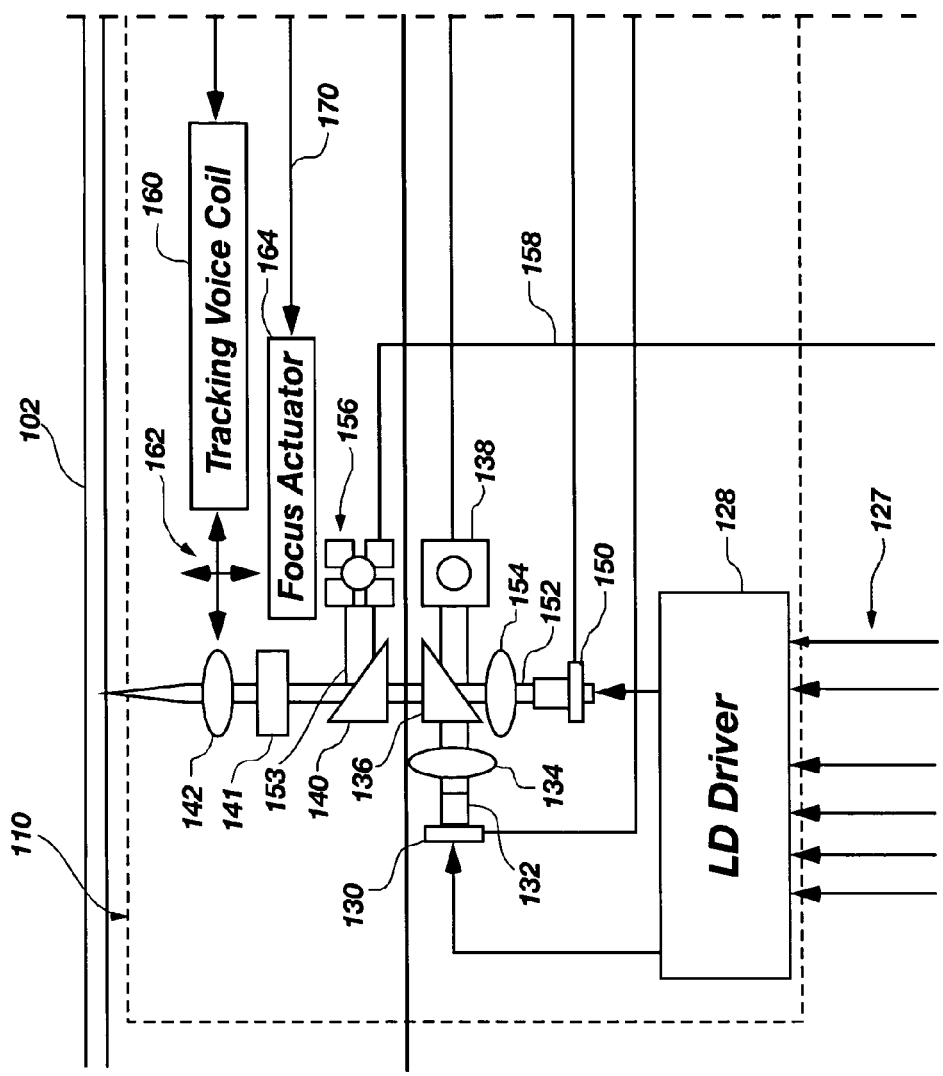
FIG. 2 is a partial schematic view of the diagram shown in FIG. 1.

FIGS. 1 and 2 show a data storage device 100 according to an embodiment of the invention, in which a laser 130 is used for reading from and/or writing to an optical disc 102 in which the data area is on one side of the disc and the label area is on the other side of the disc. More specifically, the data storage device 100 is used for reading and/or writing to an optically writable data side 104 of the optical disc 102. After the data writing operation is completed, the optical disc is turned over so that the label side 106 of optical disc may be written upon, for the purpose of labeling and otherwise marking the optical disc 102. An optical pickup unit (OPU) 110 provides the energy beam, lenses and other devices necessary to provide energy beams for reading and writing the medium, as explained below.

The storage device 100 includes a spindle motor 112 and a spindle 114 for rotating the optical disc 102. Specifically, the optical disc 102 is situated on the spindle 114, which is rotated or moved by the spindle motor 112 to a position specified by an input control signal 116. A controller 118 provides control signal 116 to the spindle motor 112, and may be comprised of control hardware and/or software.

The storage device 100 further includes a sled motor 120 and a sled rail 122 for moving a sled (not shown) that supports the OPU 110. Specifically, the OPU 110 is situated on the sled that is moved on the sled rail 122 by the sled motor 120 to a given position specified by a sled control signal 124 coming from controller 118.

The OPU 110 writes and reads label data on label side 106 of optical disc 102. In one embodiment, the optical disc 102 is rotated by spindle 114 as the label data is written on optical disc 102. The sled causes the OPU 110 to move radially so that the label data is written in radial increments that may or may not constitute tracks on optical disc 102. The manner of moving the spindle 114 and sled to cause the OPU 110 to write label data is not a part of this invention and may vary in different applications of the invention. Examples of this label writing operation are given in copending U.S. patent application Ser. No. 10/898,392, filed Jul. 23, 2004 entitled "Track Labeling On a Medium," and copending U.S. patent application Ser. No. 10/867,36, filed Jun. 14, 2004 entitled "Detecting Radius Of Optically Writable Label Side Of Optical Disc At Which Markings Have Not Been Written."

Again referring to FIG. 1, controller 118 generates laser control signals 127 to a laser diode driver 128 to drive the power output of laser 130. A tracking voice coil 160 is connected to a fine adjustment mechanism 162 to make small adjustments to the tracking operation of the sled and sled motor 120. Concentric tracks, such as are used on the data side 104 of optical disc 102 may not be needed on the label side 106. Instead, the sled may move in small increments, such as about 150 micron steps, to provide the desired image labeling. A focus actuator 164 is associated with lens 142 to adjust focus of lens 142 as desired. A tracking control signal 166 is directed from controller 118 to the tracking voice coil 160. A focus control signal 170 is directed from the controller 118 to the focus actuator 164.

Next, looking at FIG. 2, the OPU 110 is shown in greater detail. A write laser 130 is disposed to generate a laser beam 132 that is directed to lens 134, changing the diverging beam to a substantially collimated beam. The beam 132 then passes to a dichroic mirror 136 that causes a portion of the beam to be reflected and pass through the polarizing beam splitter 140. The remainder of beam 132 passes through dichroic mirror 136 to a front sense diode 138 that senses the strength of beam 132. After passing through polarizing beam splitter 140, beam 132 is directed through a quarter wave plate 141 and a focusing lens 142 to write on label surface 106 of optical disc 102.

The quarter wave plate 141 changes linearly polarized light from the laser (P polarized) to circularly polarized light. The circularly polarized light is reflected from the disc 102 and is changed back into linearly polarized light (S polarized) by the quarter wave plate 141. The resulting light is at 90 degrees polarization to the original light from the laser. This allows the returned S polarized light to be reflected by the polarizing beam splitter 140. The quarter wave plate 141 is required for the beam splitter 140 to operate.

In one embodiment of the present invention, a separate detection laser may be used having wavelengths in the visible spectrum, in order to enhance detection capabilities. As shown in FIG. 2, a detection laser 150 generates a beam 152 that passes through a lens 154, acting to change the beam 152 to a substantially collimated beam. Beam 152 passes through dichroic mirror 136 polarizing beam splitter 140 to impinge upon the image written earlier on label surface 106 by focused beam 132. The reflected beam 153 passes back through lens 142 and quarter wave plate 141 to polarizing beam splitter 140. A portion of the reflected beam 153 is intercepted by four photo-detectors 156. A detection signal, called a SUM signal 158, is generated by photo-detectors 156 and sent to a processor 159, shown in FIG. 1. This SUM signal corresponds to the reflected light from the disc surface.

In one embodiment of a label writing operation, the write laser 130 may be an infrared diode laser emitting a light beam having a wavelength, in one embodiment, of about 780 nanometers in order to effectively interact with chemicals on the medium and cause image marking to take place. Different wavelength light beams may be emitted in other embodiments to effectively interact with different chemistries for making marks. The detection laser 150 may be a red laser, operating in the visual spectrum of light at about 650 nanometers, in order to detect the visual characteristics and intensity of the marks.

The focus actuator 164 and tracking voice coil 160 are used in writing data on the data side 104 of optical disc 102. When writing to the label side 106, the tracking voice coil 160 may be used even though there are not any tracks to follow. This may be done by radially stepping incrementally on a label portion of an optical disc, even though there are no data tracks, as described more fully with respect to the text accompanying FIG. 8 below. The focusing lens 142 may be an objective lens that would be separately focused to accommodate the different wavelengths of the write laser 130 and the detection laser 150. If tracking is used and if radial positioning were held constant, the red and infrared lasers would focus to the same track.

The laser diode driver 128 may utilize a digitally enabled current source set to a selected current value by an external resistor. The four photo-detectors 156 represent four quadrant sensors used to generate an output signal 158 to the processor 159. Processor 159 is in two-way communication with controller 118 via link 119 to provide feedback for adjustments to the drivers as needed. Processor 159 may cause the controller 118 to generate control signals 127 to the laser diode driver 128, to thereby adjust the power level of laser 130.

Determining Shape and Quality of Marks on Media

Desired marks or sets of marks are used to provide predefined reference data that is stored in the system. This reference data may include sets of data for different laser power/spindle speed ratios. The width and length of the reference marks are provided for different spindle speeds and write powers. A reference ratio of speed and power is selected for an operating point that optimally balances the system between ablation and fade thresholds. The reference data is then stored for use during test calibration of the laser power and spindle speed.

In recording on a particular optical medium, it is useful to first determine how the characteristics of that medium will affect the recording operation. This may be done by recording test marks or sets of test marks in a test area on that medium at different power/speed ratios. Reflections from these test marks are detected and compared to the reference data, to determine actual differences between the test marks and the reference marks that are indicative of labeling characteristics of the medium. The operating point having an optimal power/speed ratio for the medium is determined, and the laser power and/or spindle speed are adjusted accordingly.

Figure 3:
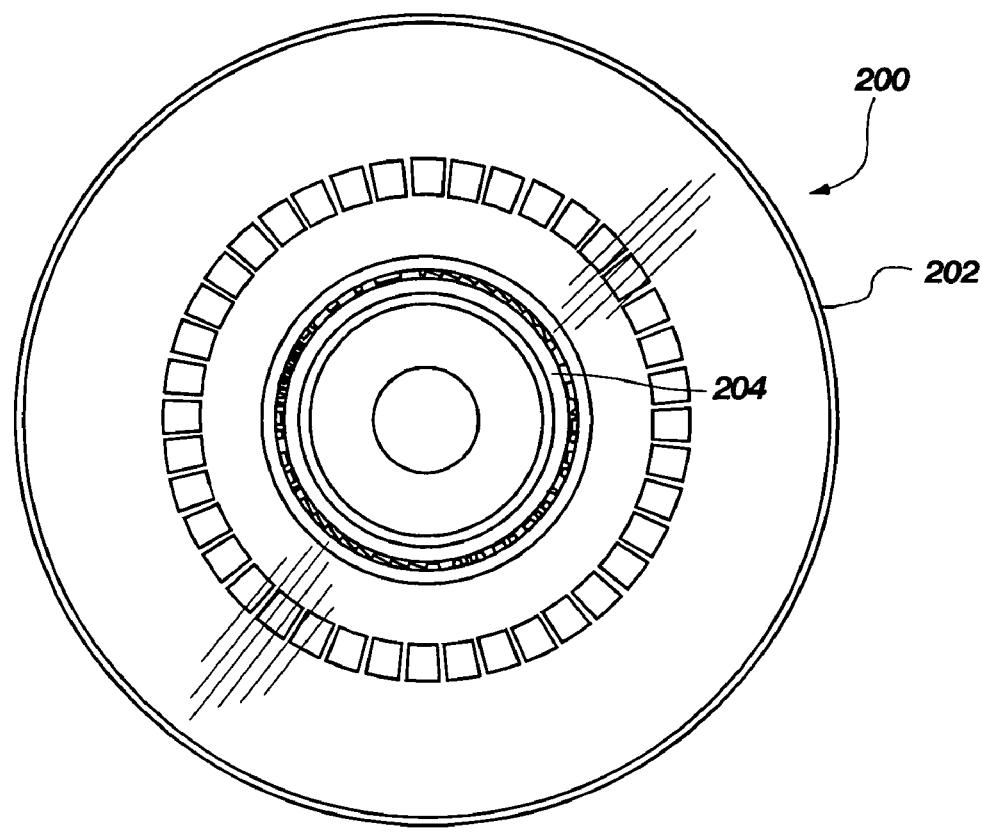
FIG. 3 is a planar view of an optical disc used in connection with an embodiment of the present invention.
Figure 4:
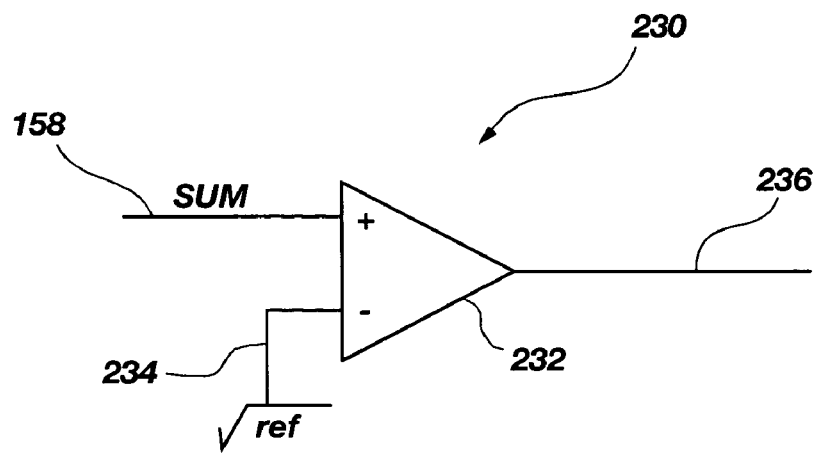
FIG. 4 is a schematic diagram of analog to digital circuitry used in connection with an embodiment of the present invention.

FIG. 3 shows an optical disc 200 having a surface 202 with a test area such as ring 204 for writing test marks on test tracks prior to marking images on a label. A write beam may be directed to the test ring 204 to write the test marks. Then a beam is directed to the test ring 204 to detect the test marks, and the light reflected from the test marks is directed to the OPU. As shown in FIG. 2, the reflected laser beam 153 is directed to photo-detector 156 from the mirror area and generates the corresponding SUM signal 158. Although the test marks may not be erased, the marks are relatively unobtrusive in size and placement and may be non-visible to a human eye, so that they do not interfere with labeling. Referring now to FIG. 4, a simplified diagram illustrates the detection and control function in FIG. 2, wherein the detection or SUM signal 158 is processed by processor 159 and used to control the LD driver 128 to calibrate the detection laser 150 and write laser 130. In FIG. 4, the SUM signal 158 is passed through a threshold detector 230 comprising an analog to digital converter 232 having the sum signal 158 as a positive input and a reference signal 234 as the negative input. The output signal 236 corresponds to signals 127 shown in FIG. 2 and is used to calibrate both the detection laser 150 and the write laser 130. When the light beam is projected on a medium without a mark, a substantial amount of light may be reflected back. When the light beam detects a mark, a substantial amount of light is absorbed by the mark, depending on the darkness or optical density of the mark. Accordingly, less light may be reflected back from a mark than from a clear medium between marks.

Figure 5:
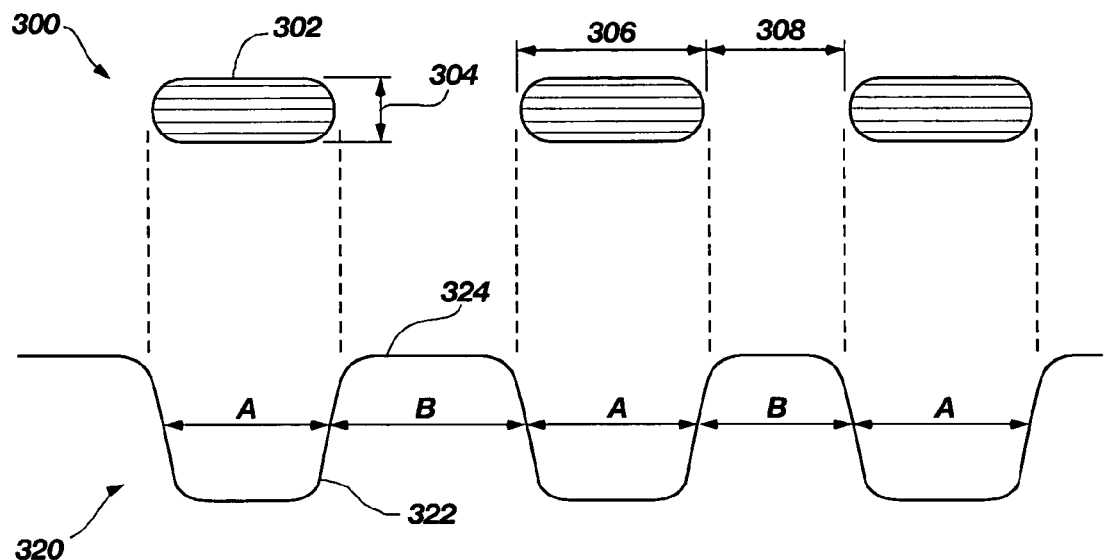
FIG. 5 is a diagram of images and measurement outputs made according to an embodiment of the present invention.

FIG. 5 shows an example of a desired or reference set of marks 300. Each mark 302 has measurable characteristics that determine its nature, including a width 304 and a length 306. The distance between marks 308 may also be a relevant characteristic. When a light beam is directed to marks 300, the reflected SUM signal 320 is generated. Signal 320 may take the approximate form of a square wave having negative pulses 322 each with a length A corresponding to the length 306 of each mark, and positive pulses 324 each having a length B corresponding to the distance 308 between marks. As stated above, the amount of light reflected may be more between marks than during detection of a mark.

Darkness or optical density of a mark 302 may be affected by the width 304 and length 306 of the mark. The width and length of a mark 302, in turn may be affected by the amount of laser power used to make the mark 302 and the spindle speed at which the optical disc turns. The width of a mark tends to increase linearly with an increase in write power or a decrease in spindle speed. The length of a mark tends to increase with an increase in write power or spindle speed.

Thus, as power is increased in making the mark 302, the length 306 may lengthen, thereby increasing the length A of each negative pulse 322. Power increases may also result in the increase of the width 304 of a mark. Likewise, as spindle speed increases the mark 302 may become longer, increasing the length A of each negative pulse 322. However, spindle speed increases may reduce the width 304 of a mark 302, resulting in a net decrease in mark darkness.

Figure 6:
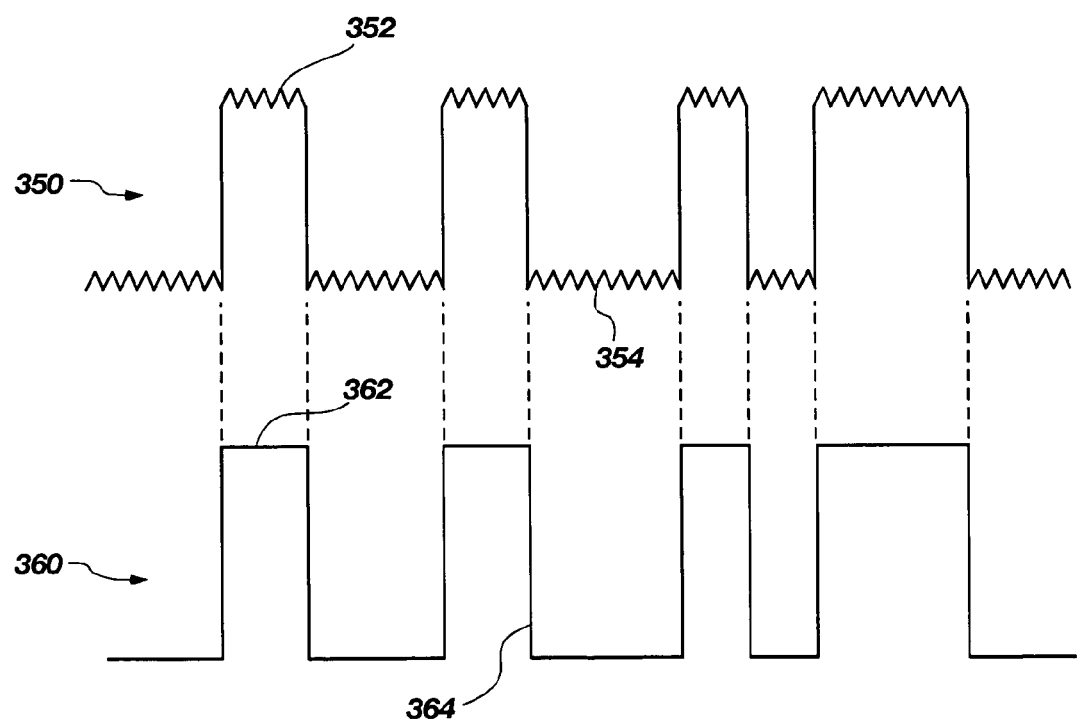
FIG. 6 is a diagram of images and measurement outputs made according to an embodiment of the present invention.

FIG. 6 shows examples of a reflection SUM signal 350 of test marks made on a recording medium. SUM signal 350 corresponds to SUM signal 158, shown in FIGS. 1, 2 and 4. For a given spindle speed, the levels of test laser power are varied, resulting in variations in the lengths of the marks being measured. A digital signal 360 equivalent to signal 350 is also shown. Each positive pulse 362 corresponds to a positive SUM signal pulse 352, indicating a length between marks. Each negative pulse 364 corresponds to a negative SUM signal pulse 354, indicating the length of a detected mark (not shown). Many different sets of such test test marks are made at different laser power levels and spindle speeds to test the characteristics of the recording medium.

Figure 7A:
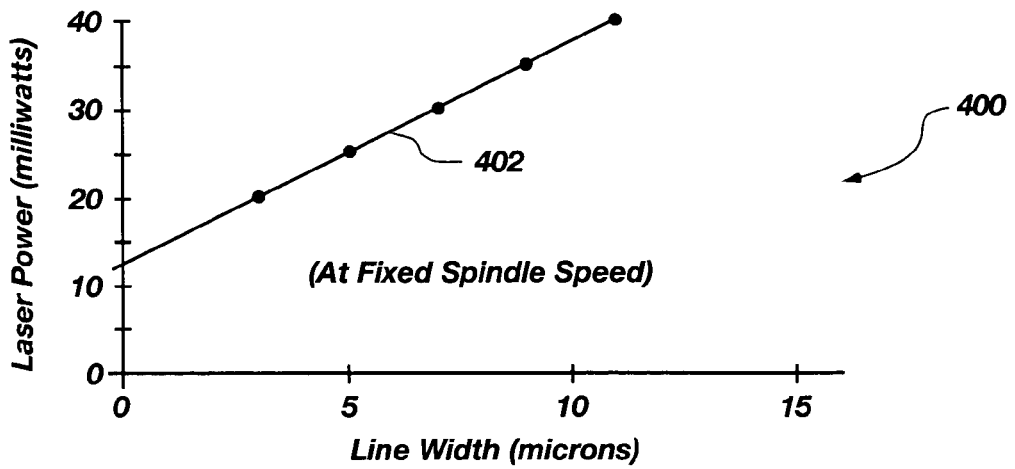
FIGS. 7A-C are diagrams relating to measurement of images according to an embodiment of the present invention.
Figure 7B:
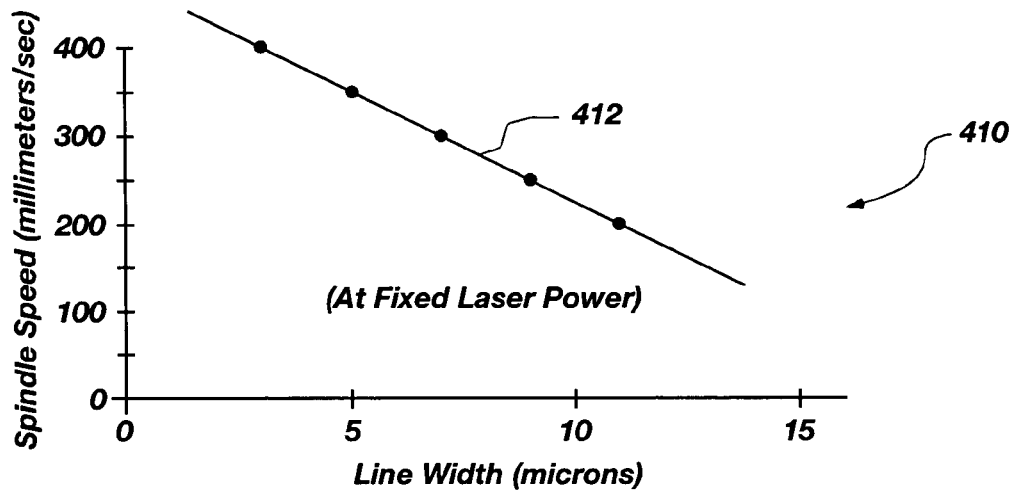

FIGS. 7A and 7B provide graphs 400 and 410 showing illustrative data concerning variations of mark width with variations in power and speed. As shown in graph 400, for a fixed speed, if laser power is increased from 20 mW to 40 mW, the line width may increase from 3 microns to 11 microns, increasing mark darkness. The resulting line 402 in graph 400 shows a linear increase in line width with an increase in laser power, at a fixed spindle speed.

Likewise in FIG. 7B which shows graph 410, if power is fixed, an increase of spindle speed from 200 millimeters per second to 400 millimeters per second may result in a decrease in mark width from 11 microns to 3 microns, decreasing mark darkness. Accordingly, as shown by line 412, there is a linear decrease in line width with an increase in spindle speed, at a fixed laser power.

Figure 7C:
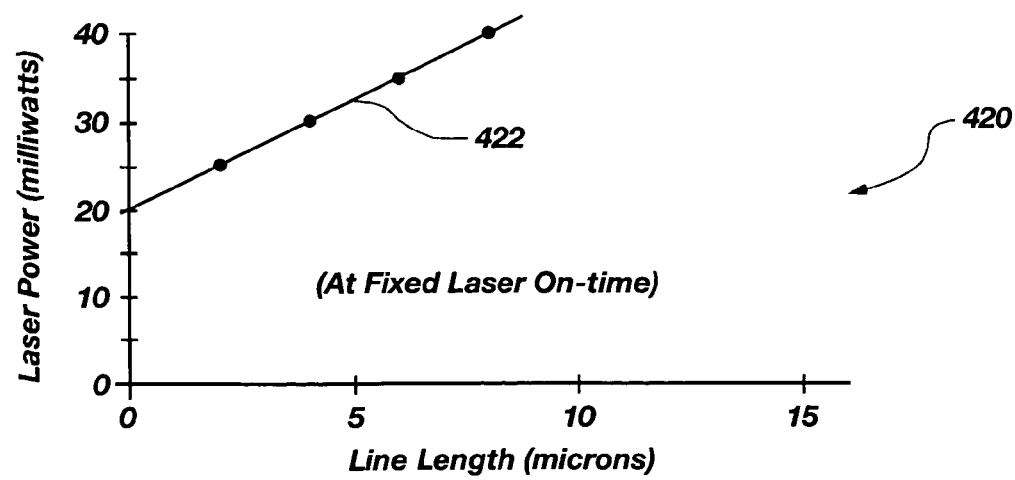

FIG. 7C provides a graph 420 showing illustrative data concerning variations in mark length with variations in laser power. Generally, the length of a mark may be a function of how long the laser power is on. However, if on-time and spindle speed are fixed, then an increase of power may lead to an increase in length of a mark, thus increasing the mark darkness. For example, as shown in graph 420, with the on-time and speed fixed, a power increase from 20 mW to 40 mW may lead to an increase in line length from 0 microns to 8 microns. Thus, line 422 shows a linear increase in line length as laser power increases at a fixed laser on-time. Likewise, with on-time and power fixed, an increase in spindle speed may lead to a longer mark but with a decreased mark width, resulting in a net reduction in mark darkness.

FIGS. 8A-C provides examples of measuring the width and length of a mark. The process shown here may be used both in measuring the dimensions of reference marks to be used for stored reference data and in measuring the dimension of test marks when testing the recording characteristics of a recording medium prior to recording.

When the laser drive is preparing to write to a recording medium, the laser writes several test marks at various spindle speed/laser power ratios. Typically, several different write powers may be selected that are evenly spaced through a range of possible operation. For each write laser power different test marks may be made sweeping the spindle speed from a selected maximum to a selected minimum.

Figure 8:
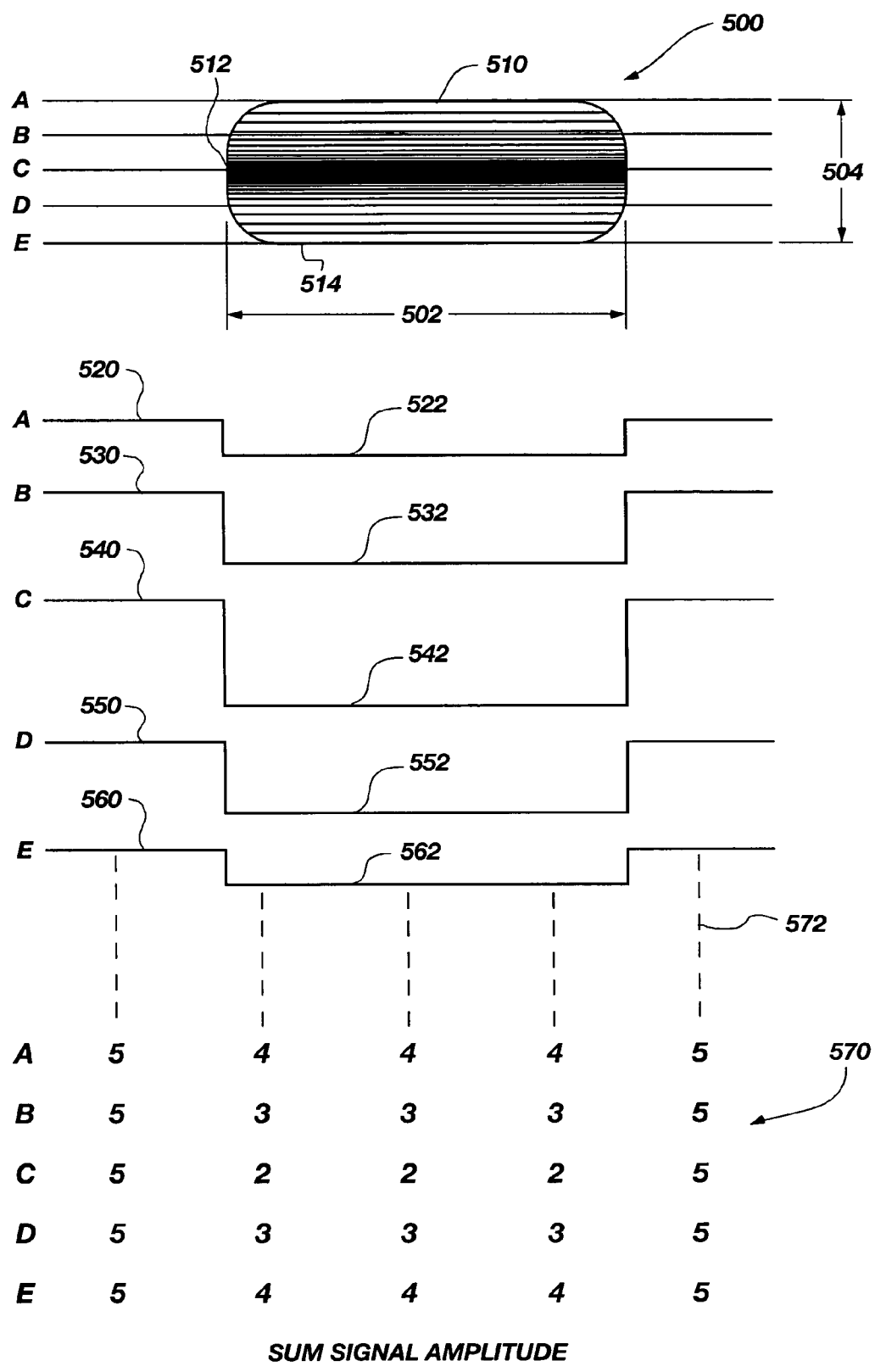
FIG. 8 is a diagram relating to measurement parameters for images according to an embodiment of the present invention.

Referring to FIG. 8, a diagram shows a process of measuring a test mark. An identical process may be used to measure a reference mark. After each test track is written, the system receives reflections from each test mark in order to measure the dimensions of the test marks and analyze them. A test mark 500 is shown having a length 502 and a width 504. After the test mark 500 is written, the mark is measured by rotating the disc several more times, each time sampling the SUM signal along a sampling track in the area of mark 500. The tracking voice coil 160, sometimes called a fine actuator, is shown in FIG. 1. This fine actuator may cause the detection laser to step across mark 500, so that the SUM signal is a reflection of different parts of the mark with each revolution.

Referring again to FIG. 8, during a first revolution, the fine actuator may cause the detection laser to follow track A at an offset along an upper edge 510 of the mark. For subsequent revolutions, the fine actuator may follow track B for another measurement, and then step to the center 512 of the mark at track C for the next measurement. In subsequent revolutions the detection laser may follow tracks D and E to the lower edge 514 of the mark. This sum data may then be converted to digital numbers, recorded in memory and analyzed.

Directly below the mark 500 the analog outputs 520-570 of the SUM signal are shown, indicating a degree of darkness detected along each track. At track A, the analog signal 520 includes a small incremental drop 522 in voltage, corresponding to a reduction in reflection because of light shading of darkness along the edge 510 of mark 500. The incremental drop 522 continues for a distance corresponding to the length 502 of the mark. The next signal 530 corresponds to a traverse of the detection laser and resulting SUM signal along track B. This time a portion of the mark 500 is detected that is darker than when sensing on track A, resulting in a drop in voltage 532 that is greater than the corresponding drop in voltage 522 for signal 520.

Similarly, signal 540 corresponds with the detection laser following track C along the center 512 of mark 500. The result is a greater voltage drop 542 for the length 502 of the mark 500. Subsequent traversing of the detection laser along tracks D and E results in SUM signals 550 and 560 with corresponding lesser voltage drops 552 and 562 respectively.

Below the analog output signals 520-560, a numeric conversion matrix 570 of analog signals is given, with numbers corresponding to the changing level of each signal. Thus, each signal starts at a common value of 5 and then drops to a number representative of the amount of voltage drop experienced during each track traversed by the detection laser. Sampling occurs along the dotted lines 572. For each track, when the longitudinal traverse of the mark is finished the value of the SUM signal returns to the value 5. The numbers provided herein are arbitrary and may also be oversimplified to illustrate the operation of the present embodiment.

The numbers shown in conversion matrix 570 may be stored in memory (not shown) if the mark being measured is a reference mark. For a test mark, the numbers in conversion matrix 570 may be compared to numbers stored for a reference mark, in order to determine whether the test mark compares favorably to the reference mark.

It should be understood that measuring the width alone of a mark may be sufficient to determine the quality of the mark, without measuring the length of the mark. Reference data for the width of desired marks may be compared to measured data for the widths of test marks in order to determine that the quality of test marks are satisfactory. Accordingly, although both width and length measurements are shown in the present embodiments, the use of width measurements alone may suffice according to the present invention.

It should also be understood that other marks, such as data marks in a data area of a recording medium, may also be analyzed for quality by measuring and comparing widths or widths and lengths of test marks, as described above.

Figure 9:
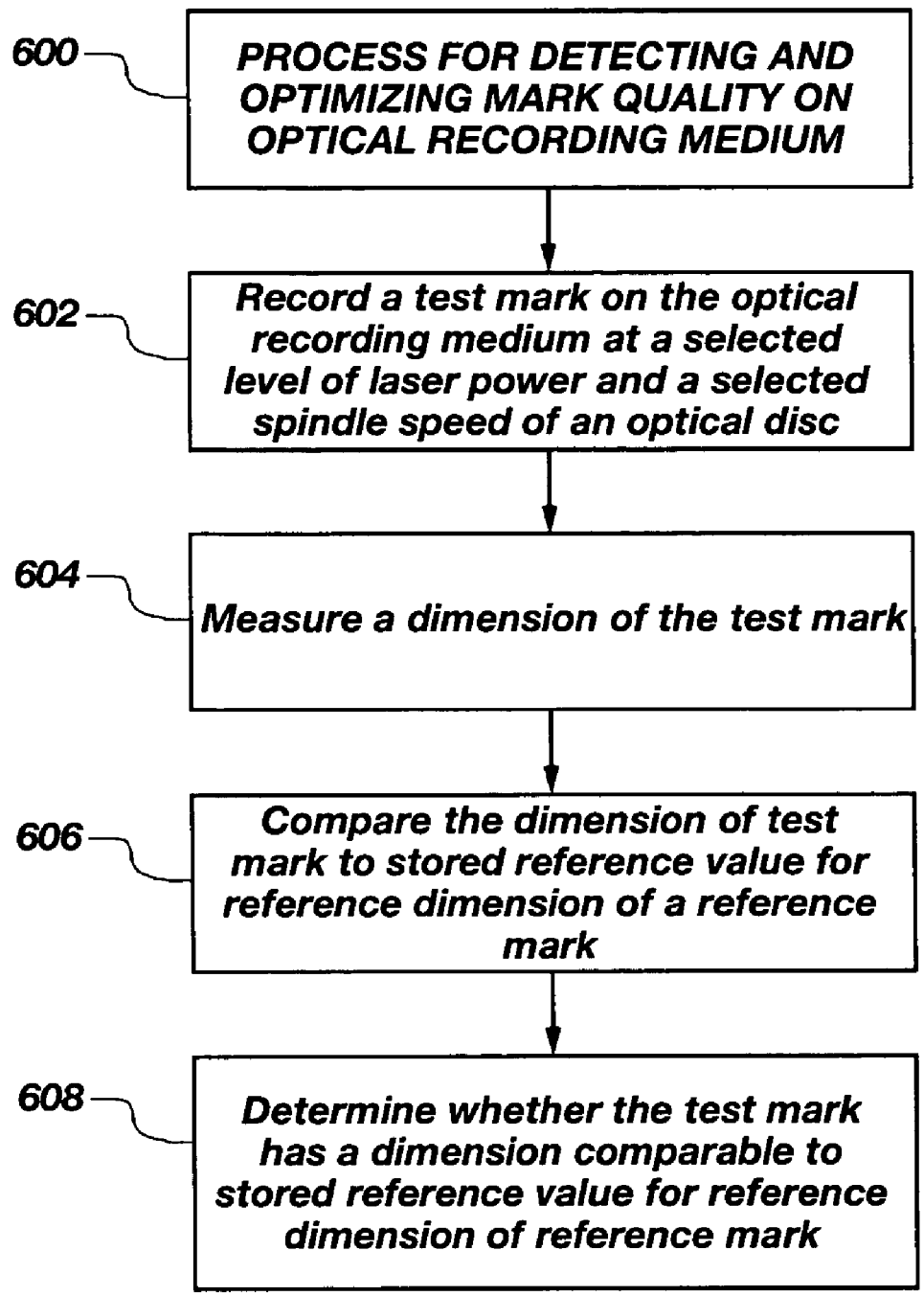
FIGS. 9 and 10 are flow diagrams of a mark measurement method used in connection with embodiments of the present invention.

FIG. 9 is a flow diagram showing a process 600 for detecting and optimizing mark quality on optical recording medium. At step 602, a test mark is recorded on a recording medium. At step 604, one or more dimensions of the test mark is measured. The measured dimension(s) may be width, length, both width and length, or some other dimension or combination of dimensions of the mark. Then at step 606 the dimension(s) of the test mark is compared to reference dimension(s) of stored reference values for a reference mark. Finally at step 608 a determination is made as to whether the dimension(s) of the test mark is comparable to the reference values for the dimensions of the reference mark. The length of the test mark may also be measured, as shown in FIG. 8, in order to better determine the overall dimensions of the test mark. In that case, the length of the test mark may also be compared to the reference length of stored reference values for a reference mark, to make a determination as to whether both the width and the length of the test mark are comparable to the reference values for the width and the length of the reference mark.

Figure 10:
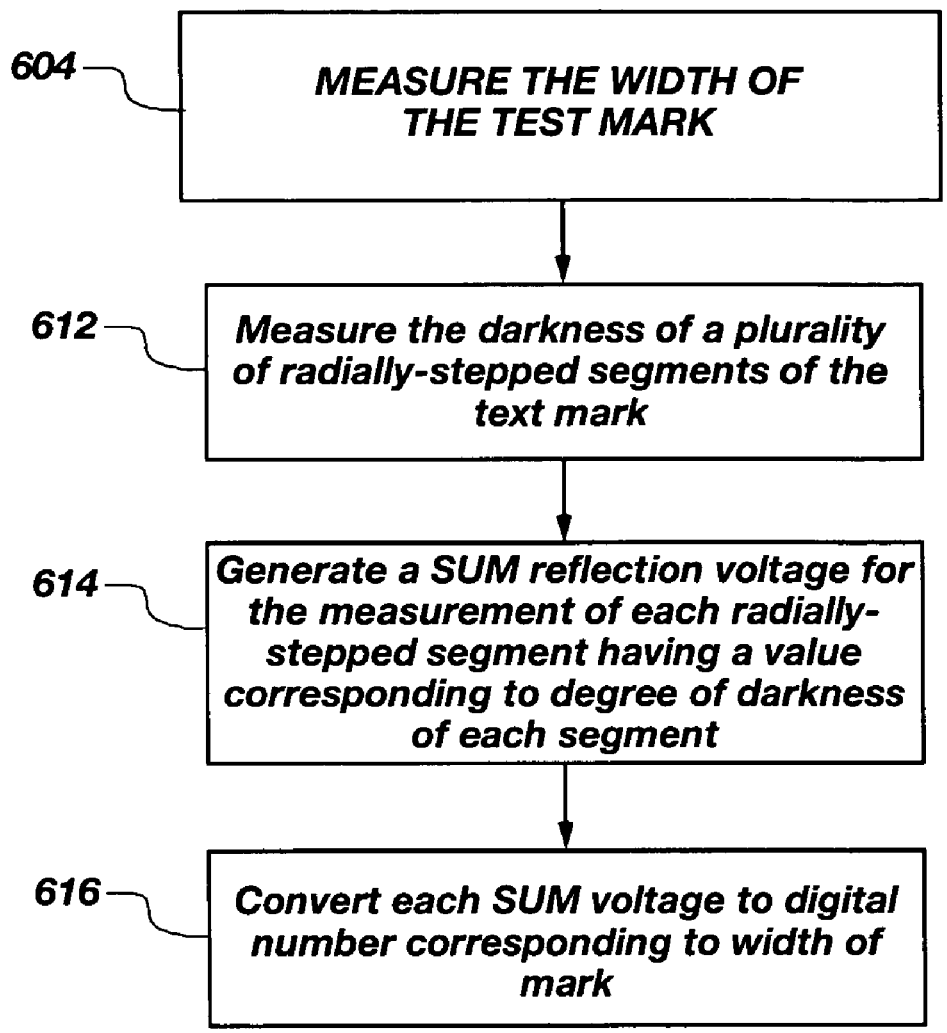

FIG. 10 is a flow diagram that shows in more detail the step 604 in FIG. 9 of measuring one or more dimensions of the test mark. In the embodiment of FIG. 10, the dimension is mark width and the width measurements correspond to the diagrams shown in FIG. 8. In one embodiment, in which the medium is rotated and the markings are formed in a circumferential manner, at step 612, darkness measurements are made of each of a plurality of radially-stepped segments of the mark, each made in a circumferential sweep or pass of the mark. At step 614, a SUM reflection voltage is generated for the measurement of each transverse segment, having a value corresponding to the degree of darkness detected during each pass. Next, at step 616, the SUM voltages are converted to digital numbers, to provide a numeric matrix representative of the width of the mark.

Looking back at the comparison step 606 in FIG. 9, the numeric matrix generated in step 616 of FIG. 10 may then be compared to a similar numeric reference matrix stored in memory to determine whether the width of the test mark is comparable to the width of the reference mark.

One purpose for measuring a test mark is to determine whether an optical recording system should be adjusted to produce marks having high image quality. If there is a significant difference between the test mark and the reference mark, the laser power or other parameters in the optical recording system may need to be adjusted to minimize or eliminate this difference.

Figure 11:
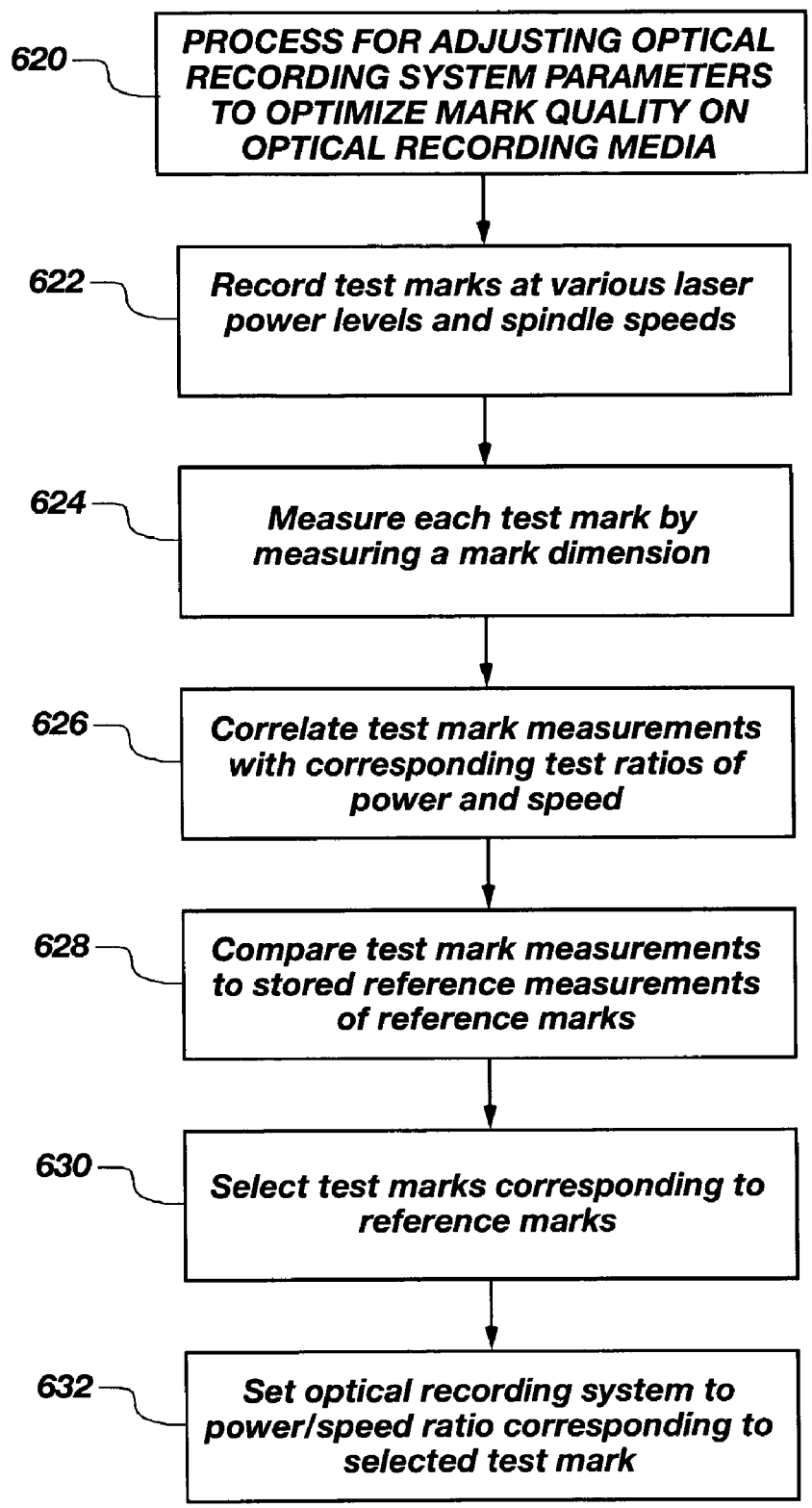
FIG. 11 is a flow diagram of a process for adjusting optical recording system parameters to optimize mark quality according to the embodiment shown in FIG. 9.

FIG. 11 is a flow diagram 620 of a process for adjusting optical recording system parameters in order to optimize mark quality according to the embodiment shown in FIG. 9. At step 622, prior to recording desired markings on a selected optical medium, one or more sets of test marks are made at various laser power levels and various spindle speeds. Then, at step 624, measurements of each test mark are made by measuring one or more dimensions of each mark. At step 626, these measurements are each correlated with a corresponding ratio of power and speed. Next, at step 628, the dimension measurements of the test marks are compared to stored reference measurements of desired reference marks. At step 630, the marks are selected that correspond to the reference marks, and at step 632, the system is set to a power/speed ratio that corresponds to the selected mark. This selected power/speed ratio will provide an operating point for the selected optical recording medium that will produce marks substantially the same as the reference mark corresponding to the reference power/speed ratio.

Increasing Sensitivity of Detecting Marks

As mentioned previously, several factors contribute to a problem in detecting and determining the quality of a mark because of a very low signal-to-noise ratio (SNR). One method of increasing the detect signal is to simply increase the detection laser power. However, there are problems with that approach. If the detection power delivered to the recording medium exceeds a certain level, ablation of the medium may occur. Moreover, if power of the detection laser is sustained for too long at a given level, chemical reactions begin to occur which could result in further marking rather than simply detecting existing marks.

Figure 12:
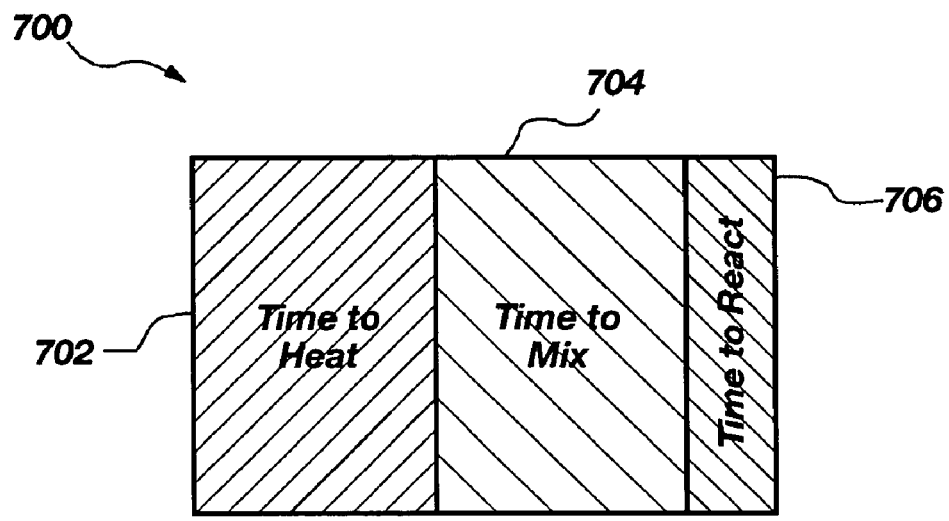
FIG. 12 is a timing graph according to an embodiment of the present invention.

FIG. 12 shows a timing graph 700, depicting without quantification the time required to make an acceptable mark, according to the present invention. Time period 702 represents a time during which the recording medium (not shown) must be heated to a level at which liquefaction begins. A second longer time period 704 represents a time during which the marking materials become liquefied enough to mix together. Finally, a shorter time period 706 represents a time during which the mixed marking materials react sufficiently to form a desired optically visible mark.

Figure 13:
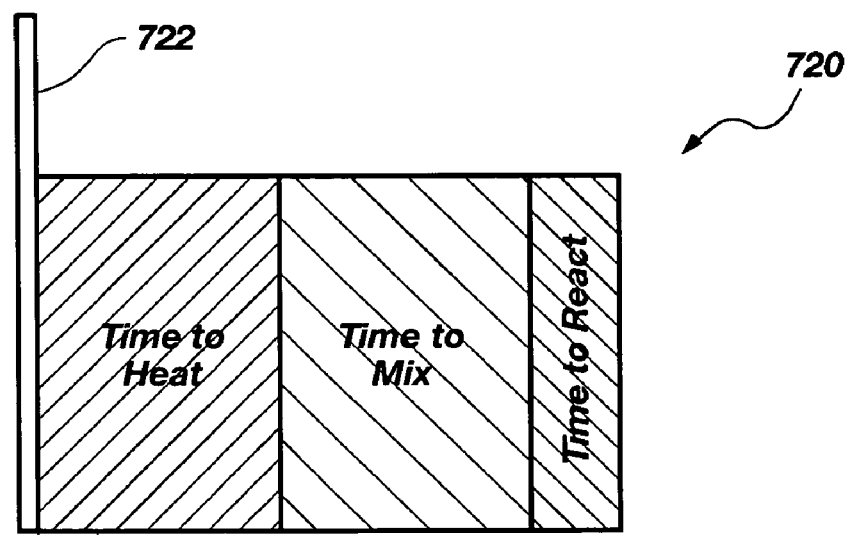
FIG. 13 is a timing graph related to the embodiment of FIG. 12.

Referring to FIG. 13, a method is shown for increasing the SNR of a detect signal without causing ablation or writing processes to occur. A mark timing graph 720 is again shown, depicting the time needed to heat, mix and react in a writing process. In addition, a short high power pulse 722 is provided to give a spike for detection purposes. This pulse 722 provides a high-powered signal that easily overcomes the SNR problems discussed previously. In addition the pulse 722 is very short, so that there is a substantial reduction in the energy needed to make an acceptable quality mark. Finally, the pulse is provided for such a short time that there is not time for the recording medium to heat up and liquefy, or to mix and react with the other chemicals.

Thus, a high-powered pulse or spike provides an efficient and simple method for substantially increasing the detection of marks. Typically, the pulse 722 may have a power level in the range of 10-50 milliwatts and a duration up to about one microsecond to be effective without causing ablation. It may be feasible to use a plurality of short pulses at the same or different power levels to further decrease the SNR problem without enough time to heat, mix or react.

It should be understood that the above-referenced arrangements are illustrative of the application for the principles of the present invention. For example, while the present invention has been illustrated with reference to a rotating recording medium such as an optical disc, other embodiments may employ a recording medium in which the relative motion of the recording medium and the laser to each other is rectilinear. In addition, while in one embodiment the label area and data area are on opposite sides of the recording medium, they may alternatively be located on the same side of the medium. It will be apparent to those of ordinary skill in the art that numerous modifications can be made without departing from the principles and concepts of the invention as set forth in the claims. In one embodiment, the present invention may be included in a program storage system readable by a computer, tangibly embodying a program, applet or instructions executable by the computer configured to cause a laser marking system to perform a method for detecting and optimizing the quality of a mark made by a laser on a recording medium.

What is claimed is:

1. A method for detecting and optimizing the quality of a mark made by a laser on a recording medium, comprising:
   (a) recording a test mark at a selected level of laser power and a selected speed of movement of the recording medium;
   (b) measuring at least one dimension of the test mark and making multiple measurements of the at least one dimension of the test mark, the multiple measurements being incrementally separated from each other;
   (c) generating a numeric matrix corresponding to the multiple measurements;
   (d) comparing the numeric matrix to a corresponding reference numeric matrix stored in memory; and
   (e) determining whether the numeric matrix corresponding to the at least one dimension of the test mark is comparable to the corresponding reference numeric matrix stored in memory.

2. The method of claim 1, wherein the at least one dimension is a width in a direction substantially orthogonal to a direction of the movement.

3. The method of claim 1, wherein the at least one dimension is a length substantially in a direction of the movement.

4. The method of claim 1, wherein the recording medium is an optical disc recording system and the selected speed of movement is a selected rotating spindle speed.

5. The method of claim 4, wherein the dimension of the test mark is correlated with the selected laser power and selected spindle speed.

6. The method of claim 5, wherein the selected laser power and selected spindle speed are applied to operate the optical disc recording system.

7. The method of claim 1, further comprising recording a plurality of test marks on the recording medium at various levels of laser power and movement speeds.

8. The method of claim 7, further comprising selecting one of the plurality of test marks that is comparable to the reference values for the reference dimension.

9. The method of claim 8, further comprising determining a related laser power and a related movement speed corresponding to the selected test mark.

10. The method of claim 1, further comprising determining the at least one dimension of the test mark by averaging the multiple measurements of the at least one dimension of the test mark.

11. The method of claim 1, wherein the test mark is a visible mark.

12. The method of claim 1, wherein the test mark is a data mark non-visible to a human eye.

13. The method of claim 1, wherein the step of measuring the dimension of the test mark comprises applying a pulse of laser power to increase detectability of the dimension of the test mark.

14. Apparatus for detecting and optimizing the quality of a mark made by a laser on a recording medium, comprising:
   (a) means for recording a test mark at a selected level of laser power and a selected movement speed of the recording medium;
   (b) means for measuring at least one dimension of the test mark, wherein measuring the at least one dimension of the test mark comprises making multiple measurements of the at least one dimension of the test mark, the multiple measurements being incrementally separated from each other;
   (c) means for generating a numeric matrix corresponding to the multiple measurements, and comparing the numeric matrix to a corresponding reference numeric matrix stored in memory;
   (d) means for comparing the numeric matrix to a corresponding reference numeric matrix stored in memory; and
   (e) means for determining whether the numeric matrix corresponding to the at least one dimension of the test mark is comparable to the corresponding reference numeric matrix stored in memory.

15. The apparatus of claim 14, wherein the at least one dimension is a width in a direction substantially orthogonal to a direction of the movement.

16. The apparatus of claim 14, wherein the at least one dimension is a length substantially in a direction of the movement.

17. The apparatus of claim 14, further comprising means for correlating the dimension of the test mark with the selected laser power and selected movement speed.

18. The apparatus of claim 17, wherein recording medium is an optical disc recording system and the movement is a rotating spindle speed, and wherein the selected laser power and selected rotating spindle speed are used to operate the optical disc recording system.

19. Apparatus for detecting and optimizing the quality of a mark made by a laser on a recording medium, comprising:
   (a) a writing laser configured to record a test mark at a selected level of laser power and a selected movement speed of the recording medium;
   (b) a detecting laser for directing a detecting light beam to the test mark;
   (c) a light detecting unit for measuring at least one dimension of the test mark, wherein the light detecting unit is configured to make multiple measurements of the at least one dimension of the test mark, the multiple measurements of the at least one dimension being incrementally separated from each other; and
   (d) a processor configured to generate a numeric matrix corresponding to the multiple measurements, to compare the numeric matrix to a corresponding reference numeric matrix stored in memory, and to determine whether the numeric matrix corresponding to the at least one dimension of the test mark is comparable to the corresponding reference numeric matrix stored in memory.

20. The apparatus of claim 19, wherein the at least one dimension is a width in a direction substantially orthogonal to a direction of the movement.

21. The apparatus of claim 19, wherein the at least one dimension is a length substantially in a direction of the movement.

22. The apparatus of claim 19, wherein the recording medium is an optical disc recording system and the selected speed of movement is a selected rotating spindle speed.

23. The apparatus of claim 22, wherein the processor is further configured to correlate the at least one dimension of the test mark with the selected laser power and selected spindle speed.

24. The apparatus of claim 23, wherein the selected laser power and selected spindle speed are used to operate the optical disc recording system.

25. The apparatus of claim 19, wherein the write laser is configured to record a plurality of test marks on the recording medium at various levels of laser power and movement speeds.

26. The apparatus of claim 25, further wherein the processor is configured to select one of the plurality of test marks that is comparable to the reference value for the at least one dimension.

27. The apparatus of claim 26, wherein the processor is configured to determine a related laser power and a related movement speed corresponding to the selected test mark.

28. The apparatus of claim 19, wherein the processor is configured to determine the at least one dimension of the test mark by averaging the multiple measurements of the at least one dimension of the test mark.

29. The apparatus of claim 19, wherein the test mark is a visible mark.

30. The apparatus of claim 19, wherein the test mark is a data mark non-visible to a human eye.

31. The apparatus of claim 19, wherein the light detecting unit for measuring the at least one dimension of the test mark comprises a pulsing unit for applying a pulse of laser power to increase detectability of the at least one dimension of the test mark.

32. The apparatus of claim 19, wherein the writing laser and the detecting laser are the same laser.

33. The apparatus of claim 19, wherein the writing laser and the detecting laser are different lasers.

34. The apparatus of claim 19, wherein the writing laser is an infrared laser and the detecting laser is a red laser.

35. A program storage system readable by a computer, tangibly embodying a program, applet or instructions executable by the computer configured to cause a laser marking system to perform a method for detecting and optimizing the quality of a mark made by a laser on a recording medium, comprising:

(a) recording a test mark at a selected level of laser power and a selected speed of movement of the recording medium;

(b) measuring at least one dimension of the test mark and making multiple measurements of the at least one dimension of the test mark, the multiple measurements being incrementally separated from each other;

(c) generating a numeric matrix corresponding to the multiple measurements;

(d) comparing the numeric matrix to a corresponding reference numeric matrix stored in memory; and (e) determining whether the numeric matrix corresponding to the at least one dimension of the test mark is comparable to the corresponding reference numeric matrix.

36. The program storage system of claim 35, wherein the at least one dimension is a width in a direction substantially orthogonal to a direction of the movement.

37. The program storage system of claim 35, wherein the at least one dimension is a length substantially in a direction of the movement.

38. The program storage system of claim 35, wherein the at least one dimension of the test mark is correlated with the selected laser power and selected movement speed.

39. The program storage system of claim 38, wherein the selected laser power and selected movement speed are used to operate the recording medium.

40. A method for detecting an optically visible mark formed by applying a light beam onto a light-sensitive surface of a recording medium at a first power level sufficient to form the mark, comprising:

applying a pulse of the light beam onto the light-sensitive surface at a second power level greater than the first power level, wherein the pulse has a duration sufficiently short so as to not form an additional optically visible mark on the light-sensitive surface; and measuring light from the light beam that is reflected from the light-sensitive surface during the duration so as to detect the optically visible mark.

41. The method of claim 40, wherein the light beam is a laser beam.

42. The method of claim 41, wherein the pulse duration is less than about one microsecond.

43. The method of claim 41, wherein the second power level is between about 10 milliwatts and 50 milliwatts.

44. The method of claim 41, wherein the second power level is greater than a maximum continuous write power level.

* * * * *

UNITED STATES PATENT AND TRADEMARK OFFICE
CERTIFICATE OF CORRECTION

PATENT NO. : 7,576,765 B2 Page 1 of 1
APPLICATION NO. : 11/127667
DATED : August 18, 2009
INVENTOR(S) : D. Mitchel Hanks et al.

It is certified that error appears in the above-identified patent and that said Letters Patent is hereby corrected as shown below:

In column 12, line 42, in Claim 26, before "wherein" delete "further".

Signed and Sealed this

Seventh Day of September, 2010

David J. Kappos
*Director of the United States Patent and Trademark Office*